United States Patent [19]

Byrn

[11] 4,118,455
[45] Oct. 3, 1978

[54] SOFT RUBBER STEERING WHEEL, COMPOSITION AND METHOD OF MANUFACTURE

[75] Inventor: James H. Byrn, Portland, Ind.

[73] Assignee: Sheller-Globe Corporation, Toledo, Ohio

[21] Appl. No.: 771,791

[22] Filed: Feb. 24, 1977

[51] Int. Cl.² .................. B29H 3/08; B29H 19/00; B62D 1/04
[52] U.S. Cl. .................................. 264/129; 74/552; 74/558; 156/242; 260/2.3; 264/130
[58] Field of Search .............. 74/552, 558; 260/2.3; 156/242; 264/130, 129; 428/542

[56] References Cited

U.S. PATENT DOCUMENTS

| 3,386,925 | 6/1968 | Dillhoeffer | 260/2.3 |
| 3,523,493 | 8/1970 | Berry et al. | 260/2.3 |
| 3,563,922 | 2/1971 | Massoubre et al. | 260/2.3 |
| 3,640,912 | 2/1972 | Reinhard et al. | 260/2.3 |
| 3,802,291 | 4/1974 | Young | 74/552 |
| 3,896,059 | 7/1975 | Wakefield et al. | 260/2.3 |
| 4,052,344 | 10/1977 | Crane et al. | 260/2.3 |

*Primary Examiner*—James C. Cannon
*Attorney, Agent, or Firm*—Harness, Dickey & Pierce

[57] ABSTRACT

An injection molding process for the manufacture of a sports type steering wheel rim cover having a soft feel and high wear resistance without exudation of plasticizer which could produce a slippery rim section or windshield fogging. The process includes the use of a novel soft rubber composition which achieves the above-described characteristics for a steering wheel and the invention also includes the steering wheel product made by this process and composition.

5 Claims, 3 Drawing Figures

SOFT RUBBER STEERING WHEEL, COMPOSITION AND METHOD OF MANUFACTURE

BACKGROUND OF THE INVENTION

1. Field of the Invention

The invention relates to vehicle steering wheels and more particularly to steering wheel rim constructions for automotive vehicles which have a relatively soft feel to the hand.

2. Description of the Prior Art

It is known to manufacture steering wheel rims having a soft feel and with different colors by an injection molding process using vinyl or butyrate materials. An undesirable characteristic of previously used manufacturing methods with vinyl or butyrate has been exudation of the plasticizer which could produce a slippery feel to the rim. Aging has caused the plasticizer in these previous compositions to come out of the material and collect on the windshield causing fogging. Sports type steering wheels have also been manufactured by an integral skin method but this type of wheel lacks the warm feeling of leather.

A patent showing an automotive steering wheel rim with a rigid core, a layer of soft substrate material and an outer covering is U.S. Pat. No. 3,802,291 issued Apr. 9, 1974.

It is also known to injection mold a flexible elastomer steering wheel rim in a grained mold using an SBR compound as follows:

| Parts by Weight | Ingredient |
| --- | --- |
| 15 | Whole Tire Reclaim (Non-staining) |
| 15 | 1502 SBR |
| 117 | 8214 SBR |
| 60 | Austin Black |
| 44 | Silene D |
| 3 | Zinc Oxide |
| .75 | Altax |
| .32 | Cumate |
| 4.7 | Sulfur |
| 40 | Circosol 450 Oil |

BRIEF SUMMARY OF THE INVENTION

It is an object of the present invention to provide a process for manufacturing steering wheels, a composition and a steering wheel which utilizes a unique compound having properties which are advantageous over that described above in terms of superior wear and abrasion resistance.

It is another object to provide an improved method, composition and steering wheel of this character which has a soft feel, high resistance to wear, and avoids exudation of plasticizer which could produce a slippery rim section or windshield fogging.

It is also an object to provide a novel and improved method, composition and steering wheel of this nature which, when required, can receive a paint coating which increases even further the wear resistance of the steering wheel.

Briefly, the invention, in its method form, comprises a method of forming a cover on a steering wheel of the type having a hub, spokes and an annular metal core, comprising the steps of furnishing a compound having the following ingredient:

| Ingredient | Preferred Range (Parts by Weight) |
| --- | --- |
| SBR 8214 (a cold type oil-extended SBR) | 100–135 |
| SBR 1502 (a cold type SBR) | 10–25 |
| Whole Tire Reclaim (Non-staining) | 5–25 |
| Kaolin | 10–40 |
| carbon black | 20–80 |
| Sulfur | 3–6 |
| Zinc Oxide | 1–10 |
| benzothiazyl disulfide | 0.1–2.0 |
| copper dimethyl dithiocarbamate | 0.1–2.0 |
| naphthenic oil | 20–60 | and injection molding said compound around said core to form a rim section cover on the steering wheel.

DESCRIPTION OF THE PREFERRED EMBODIMENT

Figure 1:
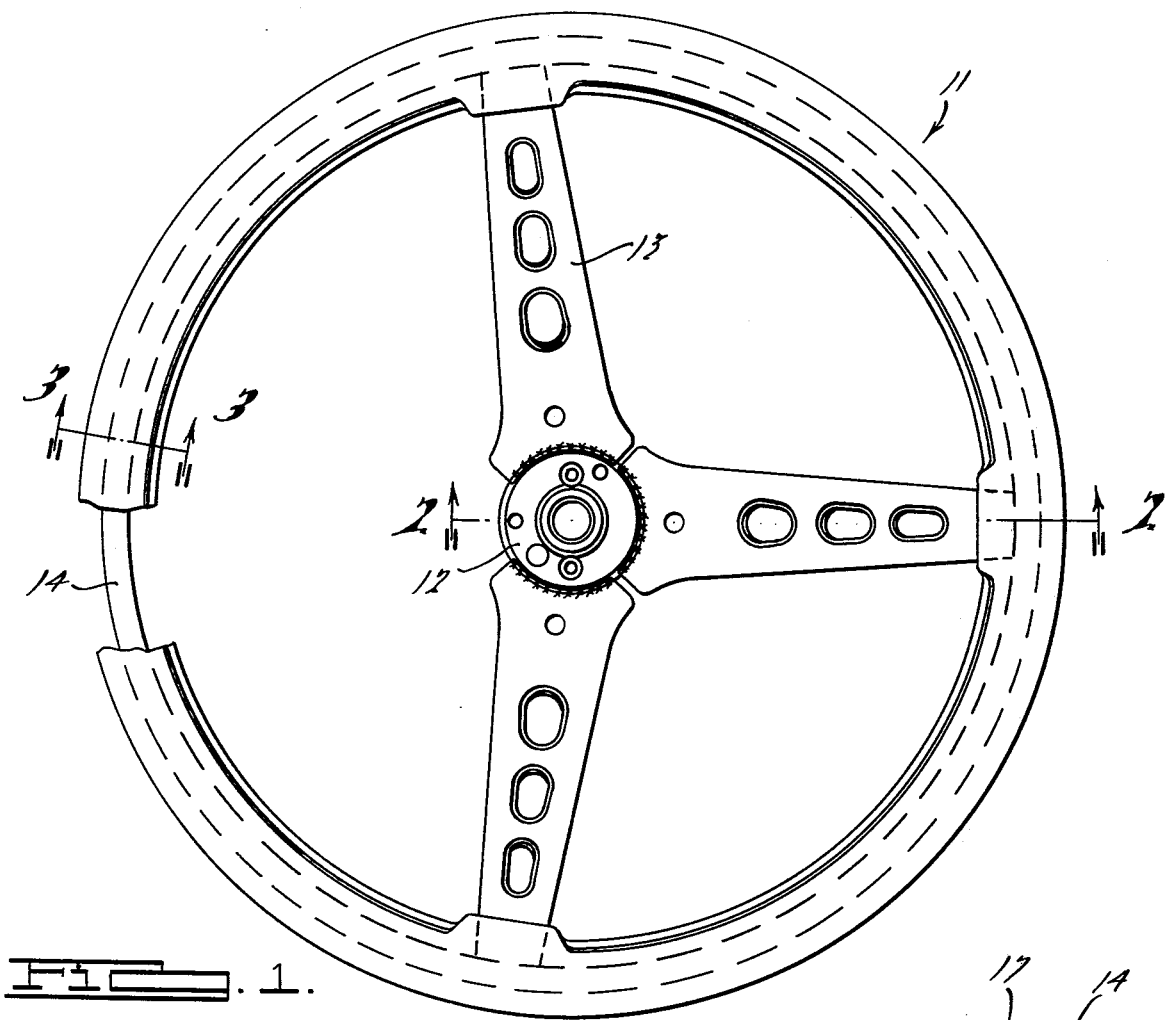
FIG. 1 is a plan view of a steering wheel incorporating the invention.
Figure 2:
FIG. 2 is a fragmentary cross-sectional view taken along the line 2—2 thereof.
Figure 3:
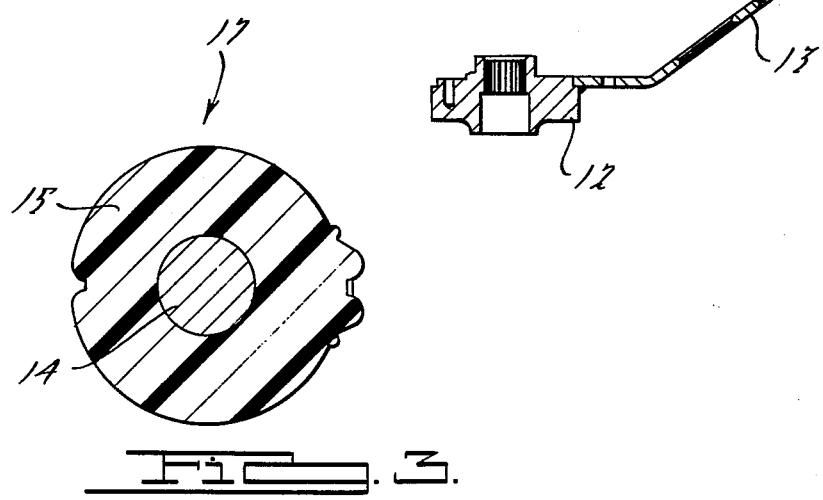
FIG. 3 is a fragmentary cross-sectional view taken along the line 3—3 of FIG. 1.

The steering wheel is generally indicated at 11 and comprises a hub 12, spokes 13 and an annular metal core 14 of circular cross-sectional shape. A cover 15 is injection molded around the core and adjacent portion of the spokes which are attached thereto by welding indicated at 16. The core and cover together may be referred to generally as the rim section 17 of the steering wheel. The mold (not shown) may be grained or otherwise provided with a decorative or friction-improving surface.

Cover 15 of rim section 17 is manufactured by injection molding a novel SBR (styrene butadiene rubber) compound in the mold. The compound has the following formula:

| Ingredient | Preferred Range | Typical Parts by Weight |
| --- | --- | --- |
| SBR 8214 | 100–135 | 117 |
| SBR 1502 | 10–25 | 15 |
| Whole Tire Reclaim (Non-staining) | 5–25 | 15 |
| Dixie Clay | 10–40 | 25 |
| FEF Black | 20–80 | 50 |
| Sulfur | 3–6 | 4.7 |
| Zinc Oxide | 1–10 | 3 |
| Altax | 0.1–2.0 | .75 |
| Cumate | 0.1–2.0 | .32 |
| Circosol 450 Oil | 20–60 | 40 |

In this formula, "Dixie Clay" is the trademark of a kaolin or hard clay manufactured by R. T. Vanderbilt Company; FEF (Fast Extruding Furnace) Black is a carbon black. These two ingredients act both as fillers and/or reinforcing agents. The sulphur acts as a vulcanizing agent and the zinc oxide as an activator. "Altax" is benzothiazyl disulfide and is a trademark of the R. T. Vanderbilt Company; this is used as an accelerator. "Cumate" is also a trademark of the R. T. Vanderbilt Company for a copper dimethyl dithiocarbamate and is also used as an accelerator to increase the cure rate. Circosol 450 Oil is a trademark of the Sun Oil Company for a naphthenic oil and is used as a plasticizer.

In this compound, Dixie Clay and FEF Black in the ranges noted replace Austin Black and Silene D of the previous compound. It has been found that the new formula greatly increases the abrasion resistance of the steering wheel and reduces the rate of wear.

Tests have shown that a steering wheel manufactured according to the above process and using this compound avoids the drawbacks previously noted of prior constructions, namely exudation of the plasticizer which could produce a slippery rim section and windshield fogging, while at the same time furnishing the warm feeling of leather.

If desired, a coating (not shown) may be applied to cover 15 in order to increase even further the wear and scuff resistance. Preferably, if a coating is to be applied, the demolded steering wheel 11 is immediately immersed in a chlorine solution which promotes paint adhesion. A preferable coating is Durethane 200, a urethane compound manufactured by PPG Industries which has been found by testing to offer superior wear and scuff resistance.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A method of forming a cover on a steering wheel of the type having a hub, spokes and an annular metal core, comprising the steps of furnishing a compound having the following ingredients:

| Ingredient | Preferred Range (Parts by Weight) |
| --- | --- |
| [SBR] cold type oil-extended styrene butadiene rubber | 100–135 |
| [SBR] cold type styrene butadiene rubber | 10–25 |
| Whole Tire Reclaim (Non-staining) | 5–25 |
| [Dixie Clay] kaolin | 10–40 |
| [FEF Black] carbon black | 20–80 |
| Sulfur | 3–6 |
| Zinc Oxide | 1–10 |
| [Altax] benzothiazyl disulfide | 0.1–2.0 |
| [Cumate] copper dimethyl dithiocarbamate | 0.1–2.0 |
| [Circosol 450 Oil] naphthenic oil | 20–60 | and injection molding said compound around said core to form a rim section cover on the steering wheel.

2. A method according to claim 1, further provided with the steps of immersing the demolded steering wheel in a chlorine solution, and coating the cover with a urethane top coat.

3. A soft rubber composition for use in the manufacture of steering wheel rim covers comprising the following:

| Ingredient | Preferred Range (Parts by Weight) |
| --- | --- |
| [SBR] cold type oil-extended styrene butadiene rubber | 100–135 |
| [SBR] cold type styrene butadiene rubber | 10–25 |
| Whole Tire Reclaim (Non-staining) | 5–25 |
| [Dixie Clay] kaolin | 10–40 |
| [FEF Black] carbon black | 20–80 |
| Sulfur | 3–6 |
| Zinc Oxide | 1–10 |
| [Altax] benzothiazyl disulfide | 0.1–2.0 |
| [Cumate] copper dimethyl dithiocarbamate | 0.1–2.0 |
| [Circosol 450 Oil] naphthenic oil | 20–60 |

4. A steering wheel having a hub, spokes radiating from said hub, an annular metal core secured to the outer ends of said spokes, and a cover on said core having the following composition:

| Ingredient | Preferred Range (Parts by Weight) |
| --- | --- |
| [SBR] cold type oil-extended styrene butadiene rubber | 100–135 |
| [SBR] cold type styrene butadiene rubber | 10–25 |
| Whole Tire Reclaim (Non-staining) | 5–25 |
| [Dixie Clay] kaolin | 10–40 |
| [FEF Black] carbon black | 20–80 |
| Sulfur | 3–6 |
| Zinc Oxide | 1–10 |
| [Altax] benzothiazyl disulfide | 0.1–2.0 |
| [Cumate] copper dimethyl dithiocarbamate | 0.1–2.0 |
| [Circosol 450 Oil] naphthenic oil | 20–60 |

5. A steering wheel according to claim 4, said cover being further provided with a urethane top coat.

* * * * *